Figure 1:
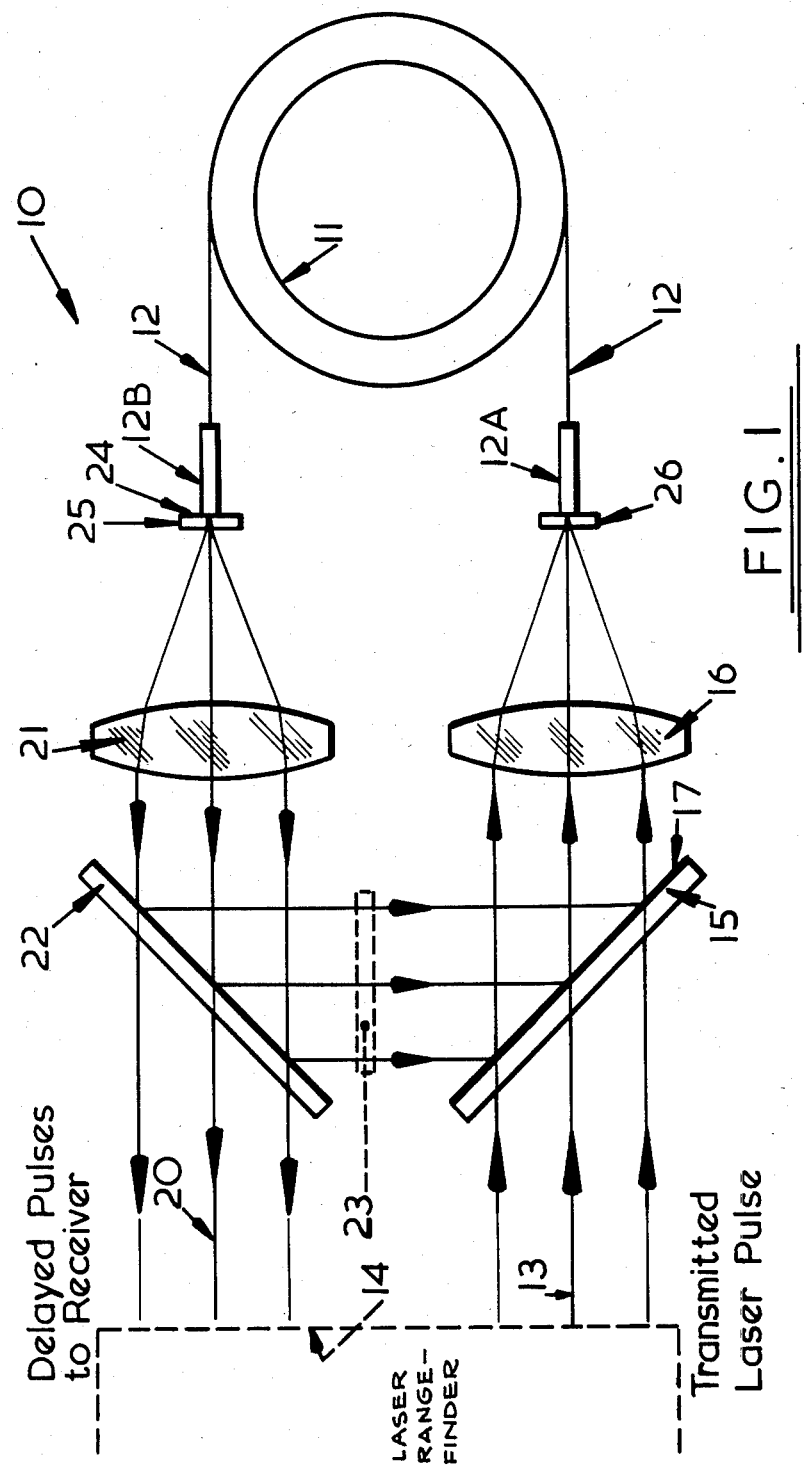

United States Patent [19]

French et al.

[11] Patent Number: 4,627,723
[45] Date of Patent: Dec. 9, 1986

[54] OPTICAL RANGE SIMULATOR DEVICES

[75] Inventors: Timothy O. French, Kings Park; Derek R. Carless, Ralston; Reginald A. Ault, Bearsden; Michael B. Darlow, Glasgow, all of Scotland

[73] Assignee: Barr & Stroud, Glasgow, Scotland

[21] Appl. No.: 608,411

[22] Filed: May 9, 1984

[30] Foreign Application Priority Data

May 19, 1983 [GB] United Kingdom ............... 8313875
Feb. 14, 1984 [GB] United Kingdom ............... 8403899

[51] Int. Cl.[4] .................... G01C 3/08; G01C 25/00
[52] U.S. Cl. ............................................ 356/5; 356/6; 434/4
[58] Field of Search ................... 356/5, 6, 72; 434/4

[56] References Cited

U.S. PATENT DOCUMENTS

| 4,068,952 | 1/1978 | Erbert et al. | 356/5 |
|---|---|---|---|
| 4,167,328 | 9/1979 | Cross et al. | 356/5 |
| 4,269,506 | 5/1981 | Johnson et al. | 356/5 |
| 4,432,640 | 2/1984 | Grage et al. | 356/5 |
| 4,552,454 | 11/1985 | Glaser et al. | 356/5 |

Primary Examiner—Stephen C. Buczinski
Assistant Examiner—Linda J. Wallace
Attorney, Agent, or Firm—Mason, Fenwick & Lawrence

[57] ABSTRACT

An optical range simulator device (10) for testing the ranging function of a laser rangefinder (14) receives output pulses from the rangefinder (14) and delivers these to an optical fibre delay line (11,12). The output of the delay line (11,12) and the input of the fibre delay line (11,12) are interconnected by an optical bridging means (15,17,22) which collects at least a portion of each pulse delivered by the output of the delay line (11,12) and recirculates that pulse portion to the input end of the delay line, the remaining portion of each pulse at the output end of the delay line (11,12) being returned to the rangefinder (14) so that for each output pulse received from the rangefinder (14) a simulator device (10) delivers a series of successively delayed return pulses to the rangefinder (14), these delayed return pulses being representative of ranges successively augmented by the range distance represented by the delay line (11,12).

9 Claims, 3 Drawing Figures

OPTICAL RANGE SIMULATOR DEVICES

This invention relates to optical range simulator devices.

In order to test the ranging function of a laser rangefinder it is necessary to fire the transmitter portion of the rangefinder at distant targets of known range to obtain a reflection therefrom which is collected by the receiver portion of the rangefinder. The distant target may be located on a real range but this requires uninhibited use of large tracts of land which is expensive and inconvenient. Alternatively the distant target may be provided in a range simulator device which is compact and takes the form of an attachment to the rangefinder. Various forms of range simulator devices are known and are described, for example, in U.S. Pat. Nos. 4,068,952, 4,167,328 and 4,189,233.

It is an object of the present invention to provide an improved form of optical range simulator device.

According to the present invention there is provided an optical range simulator device for testing the ranging function of a laser rangefinder, comprising first means defining a first optical axis for receiving output pulses from the rangefinder to be tested, second means defining a second optical axis parallel to said first optical axis for delivering return pulses to the rangefinder, an optical fibre delay line having a fibre input end and a fibre output end, the input end being coupled to receive light from said first optical axis and the output end being coupled to deliver light to said second optical axis, and optical bridging means arranged to collect at least a portion of each pulse delivered at the output end of said delay line and to deliver each said collected pulse portion to the fibre input end of said delay line, whereby for each output pulse received from the rangefinder along said first optical axis a series of successively delayed return pulses are delivered at the output end of the delay line at ranges successively augmented by that range distance represented by the optical fibre delay line.

In one embodiment said optical bridging means comprises a pair of orthogonal beamsplitters one beam-splitter being disposed across said second optical axis and the other being disposed across said first optical axis. Conveniently said one beamsplitter has approximately 50% transmission—50% reflectance characteristics and said other beamsplitter has approximately 5% transmission—95% reflectance characteristics. Alternatively both beam-splitters may have 5% transmission—95% reflectance characteristics. In this embodiment each of said first and second means comprises a convergent lens and the input and output ends of the optical fibre delay line are respectively located at a focal point of the pertaining lens.

In a second embodiment said optical bridging means comprises an optical fibre link interconnecting a pair of bi-directional optical couplers, one coupler being disposed between the delay line output end and said second optical axis and the other coupler being disposed between the delay line input end and said first optical axis. Conveniently each coupler is 3-port said one coupler delivering light to said second optical axis by means of an output optical fibre link terminated at said second optical axis and said other coupler receives light from said first optical axis by means of an input optical fibre link terminated at said first optical axis.

In a third embodiment said optical bridging means comprises an optical fibre link interconnecting a pair of two-pole fibre-optic switches the condition of which is controlled by a control means, one switch being disposed between the delay line output end and said second optical axis and the other switch being disposed between the delay line input end and said first optical axis. Conveniently each switch is substantially as described in U.K. Patent Specification No. 2107481 said one switch delivering light to said second optical axis by means of an output fibre link terminated at said second optical axis and said other switch receiving light from said first optical axis by means of an input optical fibre link terminated at said first optical axis.

In the second and third embodiments each of the first and second means comprises a convergent lens the respective input and output optical fibre link terminations being located at a focal point of the pertaining lens.

Figure 2:
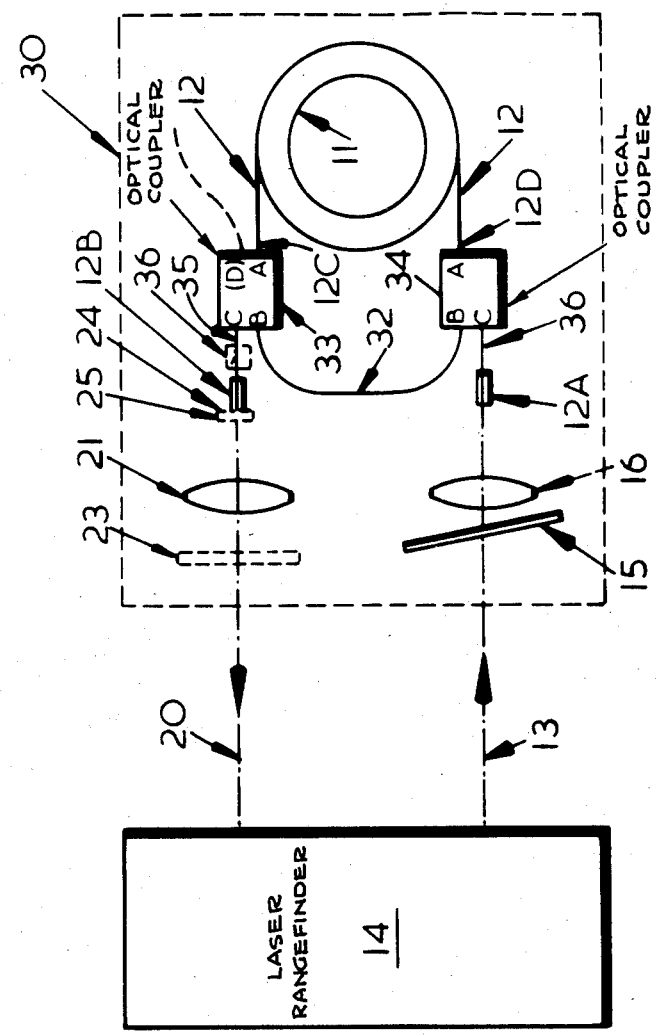
Figure 3:
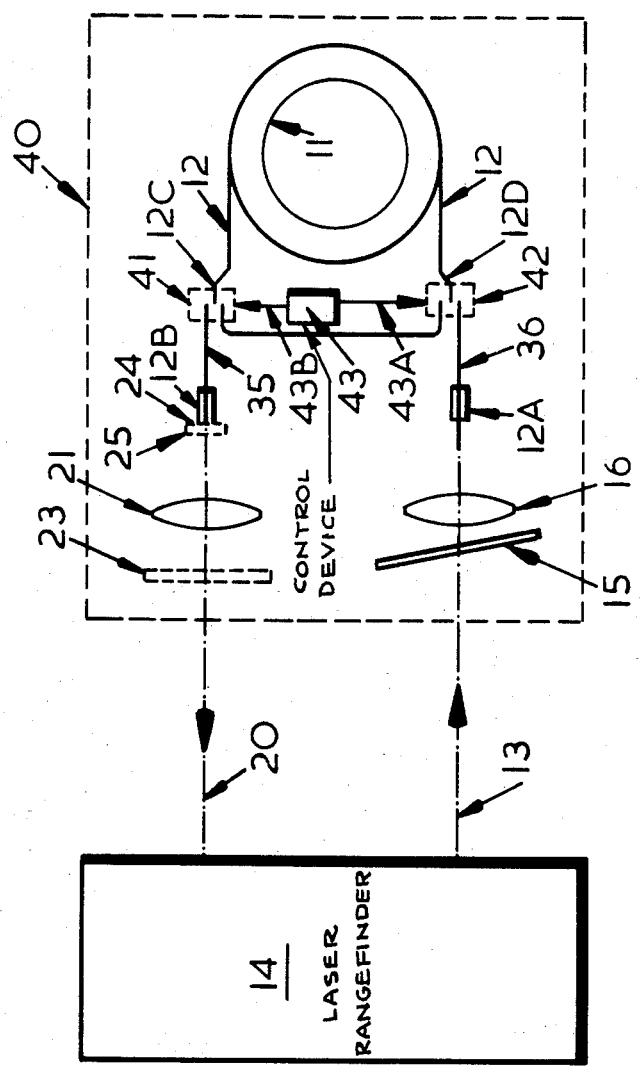

Embodiments of the present invention will now be described by way of example with reference to the accompanying drawings in which:

FIG. 1 schematically illustrates a first form of optical range simulator device according to the present invention;

FIG. 2 schematically illustrates a second form of simulator device according to the present invention; and FIG. 3 schematically illustrates a third form of simulator device according to the present invention.

The device 10 shown in FIG. 1 comprises a bobbin 11 on which is wound a length of optical fibre 12, respective ends of the fibre 12 being secured to terminations 12A, 12B which are fixedly mounted on a support structure (not shown). Termination 12A is aligned on an input optical axis 13 along which the transmitted laser pulse from the laser rangefinder 14 is transmitted, the pulse initially traversing an attenuator 15 and being focussed onto the fibre end within termination 12A by a lens 16.

Attenuator 15 is in the form of a plate disposed at 45° to the axis 13, the plate being made of an absorbing filter glass and carrying a high reflectance coating 17 on the face thereof which is adjacent lens 16, the attenuator 15 being arranged to provide attenuation of about 25 db.

The fibre end within termination 12B is aligned with axis 20 which delivers a laser pulse to the receiver portion of the rangefinder 14, this pulse being emitted by termination 12B and traversing a collimating lens 21 and a beamsplitter 22 which is arranged to provide 50% transmission and 50% reflection. Beamsplitter 22 is aligned at 45° to the axis 20, and is disposed at 90° to the attenuator 15 so that radiation reflected by beamsplitter 22 is incident on the coating 17 of attenuator 15 and is thereby reflected along axis 13 and via lens 16 into the fibre end at termination 12A. In consequence each single pulse emitted by the transmitter portion of the rangefinder 14 gives rise to a series of return pulses received by the receiver portion of rangefinder 14 along axis 20, the amplitude of successive return pulses decreasing and these return pulses being representative of reflections from targets at different distances from the rangefinder 14 due to the time delay provided by device 10 by means of the fibre wound bobbin 11.

The beamsplitter 22 together with the coating 17 which is supported by the attenuator 15 together function as an optical bridging means and may be implemented by two separate components as illustrated in the drawing or by means of a single prism. However when the bridging means is in the form illustrated it has the advantage that an attenuator 23 may be provided in the path of that portion of the return pulse which is reflected by the beamsplitter 22, the provision of this attenuator 23 enabling sensitivity or extinction tests to be carried out on the rangefinder 14.

It will be appreciated that whereas coating 17 requires to be disposed at 45° to optical axis 13 for the purpose of directing reflected return pulses to the fibre end at termination 12A the attenuator 15 plays no part in this function and could therefore be disposed perpendicular to axis 13 but disposition of attenuator 15 in the illustrated position is a convenient method of supporting coating 17.

Lens 16 is preferably a colour-corrected doublet formed by crown and flint glass elements, lens 21 being identical.

For the purpose of aligning the laser rangefinder 14 with respect to the device 10 a graticule 24 on a support plate 25 is provided at termination 12B at the focal point of lens 21 and in order to provide identical optical paths to both input and output ends of the fibre 12 a corresponding plate 26 may be provided at termination 12A.

The device 10 in addition to providing multiple return pulses from a single laser output pulse also has a physical separation of the transmit/receive axes 13,20 which thereby provides a high degree of isolation between the transmitter and receiver portions of the rangefinder 14 and in particular it will be observed that radiation reflected by attenuator 15 is reflected away from the components all aligned on axis 20. This reflected radiation may be absorbed by absorbers, if necessary.

In order to enable testing of the ranging function of both ruby laser rangefinders (which operate at 0.694 μm) and neodymium yag rangefinders (which operate at 1.064 μm) it is preferred to provide attenuator 15 in the form of a filter glass imposing about 25 db attenuation for each of the wavelengths and coating 17 providing 5% transmission at both wavelengths. Beamsplitter 22 is preferably 50% transmission, 50% reflection for each of the wavelengths and is in the form of a coating on a nonattenuating substrate. The fibre 12 is preferably a silica fibre, such as is marketed by Quartz & Silice Ltd. under their code number QSF 200A which provides about 7 db attenuation per kilometer for each of the wavelengths. Of course, if device 10 is dedicated to a single type of rangefinder a different type of optical fibre 12 may be used in order to provide an attenuation of the order of 3 db/Km at the single wavelength concerned.

In a second embodiment which is illustrated in FIG. 2, the simulator device 30 is similar in function to device 10 of FIG. 1 and components common to the two devices are denoted with the same reference numeral from which it will be seen that whereas the optical bridging means in the FIG. 1 embodiment is formed by beamsplitters 22 and 17 in the FIG. 2 embodiment it is formed by a fibre optical link 32 interconnecting a pair of bidirectional optical couplers 33,34, coupler 33 being disposed between the output end 12C of delay line 12 and optical axis 20, and coupler 34 being disposed between optical axis 13 and the input end 12D of delay line 12. To achieve this an output optical fibre link 35 is connected to coupler 33 at one end and terminates in termination 12B at its other end whilst an input optical fibre link 36 is connected at one end to termination 12A and at its other end to coupler 34.

Optical couplers 33,34, are each in the form of a 3-port device the respective ports being denoted A,B,C, and as is known light entering the device via port A emerges from both ports B and C in amounts having a ratio which can be varied from 1:1 up to 16:1 approximately. Because the couplers 33,34 are bi-directional the transfer function between ports A and B (and also between A and C) is independent of the direction of passage of light through the device so that if port B emits 10% of the light entering port A, port A will emit 10% of the light entering port B etc.

For alignment purposes graticule 24 is provided in the FIG. 2 embodiment but an alternative arrangement is to render coupler 33 4-port and to inject sufficient light through the fourth port D to illuminate the fibre end within termination 12B. This arrangement may also be used to de-sensitise automatic gain control circuits within the rangefinder 14 by continuously injecting light through port D at a sufficiently high level.

Although attenuating filter 23 is illustrated in FIG. 2 an alternative arrangement is to provide optical switch 36 either in link 35 as shown or link 32, such that switch 36 is opened at an appropriate point in time to test first-/last range logic circuitry within rangefinder 14. For example unwanted ranges can be switched out when switch 36 is in link 35 starting from the maximum range and working downwards.

In the third embodiment which is illustrated in FIG. 3 the simulator device 40 is similar in function device 30 of FIG. 2 and components common to the two devices are denoted with the same reference numeral. It will therefore be seen that the optical bridging means of FIG. 3 is formed by fibre link 32 interconnecting a pair of two-pole fibre optic switches 41, 42 disposed respectively between the output end 12C of delay line 12 and optic axis 20 and between the input end 12D of delay line 12 and optic axis 13. Control means 43 is provided to issue a control signal on line 43A to determine the position of switch 41 and to issue a control signal in line 43A to determine the position of switch 42. Conveniently control means 43 is arranged to permit an output pulse from rangefinder 14 to enter delay line 12 by initially controlling switch 42 to connect fibre end 12D to fibre link 36 and thereafter controlling switches 41 and 42 to connect fibre link 32 to fibre end 12C and to fibre end 12D so that the entirety of the time-delayed output pulses from delay line 12 are respectively recirculated through delay line 12 a known number of times until the attenuation of the delay line output is at a desired level at which point switch 41 is controlled to guide the output into link 35 and hence along optic axis 20 to the rangefinder 14.

It will be evident that in the FIG. 3 embodiment optical coupler 33 could be used in place of switch 41 in order to permit at least a portion of each delayed output pulse return to rangefinder 14 along axis 20. Also it will be evident that the attenuation of switches 41, 42 is less than that of couplers 33,34 which in turn is less that of beamsplitters 22,17 so that the sensitivity of device 40 is greater than that of device 30 which in turn is greater than that of device 10.

It will be appreciated that the system which has been described in each of the embodiments utilises the known parameters of delay line 12 to calibrate rangefinder 14 but if the parameters of rangefinder 14 were known the system could be used in reverse mode to calibrate the unknown parameters of delay line 12. For example the loss in a long length of fibre could be calculated using the parameters of a known laser rangefinder and determining the maximum rangefinder range in terms of pulse trips around the bobbin containing the unknown fibre. Fibre attenuation (at the laser wavelength) can also be determined since laser power output and receiver sensitivity are known laser parameters.

What is claimed is:

1. An optical range simulator device for testing the ranging function of a laser rangefinder, comprising first means defining a first optical axis for receiving output light pulses from the rangefinder to be tested, second means defining a second optical axis parallel to said first optical axis for delivering return light pulses to the rangefinder, an optical fibre delay line having a fibre input end and a fibre output end, the input end being coupled to receive light pulses from said first optical axis and the output end being coupled to deliver light pulses to said second optical axis, and optical bridging means comprising a pair of orthogonal beamsplitters one beamsplitter being disposed across said second optical axis and the other being disposed across said first optical axis, said optical bridging means being arranged to collect at least a portion of each light pulse delivered at the output end of said delay line and to deliver each said collected light pulse portion to the fibre input end of said delay line, whereby for each output light pulse received from the rangefinder along said first optical axis a series of successively delayed return light pulses are delivered at the output end of the delay line at ranges successively augmented by that range distance represented by the optical fibre delay line.

2. A device as claimed in claim 1, wherein said one beamsplitter has approximately 50% transmission—50% reflectance characteristics and said other beamsplitter has approximately 5% transmission—95% reflectance characteristics.

3. A device as claimed in claim 1, wherein both beamsplitters have approximately 5% transmission—95% reflectance characteristics.

4. A device as claimed in claim 1, wherein each of said first and second means comprises a convergent lens and the input and output ends of the optical fibre delay line are respectively located at a focal point of the pertaining lens.

5. An optical range simulator device for testing the ranging function of a laser rangefinder, comprising first means defining a first optical axis for receiving output light pulses from the rangefinder to be tested, second means defining a second optical axis parallel to said first optical axis for delivering return light pulses to the rangefinder, an optical fibre delay line having a fibre input end and a fibre output end, the input end being coupled to receive light pulses from said first optical axis and the output end being coupled to deliver light pulses to said second optical axis, and optical bridging means comprising an optical fibre link interconnecting a pair of bi-directional optical couplers, one coupler being disposed between the delay line output end and said second optical axis and the other coupler being disposed between the delay line input end and said first optical axis, said optical bridging means being arranged to collect at least a portion of each light pulse delivered at the output end of said delay line and to deliver each said collected light pulse portion to the fibre input end of said delay line, whereby for each output light pulse received from the rangefinder along said first optical axis a series of successively delayed return light pulses are delivered at the output end of the delay line at ranges successively augmented by that range distance represented by the otpical fibre delay line.

6. A device as claimed in claim 5, wherein each coupler is 3-port, said one coupler delivering light to said second optical axis by means of an output optical fibre link terminated at said second optical axis and said other coupler receiving light from said first optical axis by means of an input optical fibre link terminated at said first optical axis.

7. An optical range simulator device for testing the ranging function of a laser rangefinder, comprising first means defining a first optical axis for receiving output light pulses from the rangefinder to be tested, second means defining a second optical axis parallel to said first optical axis for deliverying return light pulses to the rangefinder, an optical fibre delay line having a fibre input end and a fibre output end, the input end being coupled to receive light pulses from said first optical axis and the output end being coupled to deliver light pulses to said second optical axis, and optical bridging means comprising an optical fibre link interconnecting a pair of two-pole fibre-optic switches the condition of which is controlled by a control means, one switch being disposed between the delay line output end and said second optical axis and the other switch being disposed between the delay line input end and said first optical axis, said optical bridging means being arranged to collect at least a portion of each light pulse delivered at the output end of said delay line and to deliver each said collected light pulse portion to the fibre input end of said delay line, whereby for each output light pulse received from the rangefinder along said first optical axis a series of successively delayed return light pulses are delivered at the output end of the delay line at ranges successively augmented by that range distance represented by the optical fibre delay line.

8. A device as claimed in claim 7, wherein said one switch delivers light to said second optical axis by means of an output fibre link terminated at said second optical axis and said other switch receives light from said first optical axis by means of an input optical fibre link terminated at said first optical axis.

9. A device as claimed in claim 5, wherein each of the first and second means comprises a convergent lens the respective input and output optical fibre link terminations being located at a focal point of the pertaining lens.

* * * * *